United States Patent
Mulford et al.

(10) Patent No.: US 11,838,600 B2
(45) Date of Patent: Dec. 5, 2023

(54) SYSTEM AND METHOD FOR MODELLING ACCESS REQUESTS TO MULTI-CHANNEL CONTENT SHARING PLATFORMS

(71) Applicant: GOOGLE LLC, Mountain View, CA (US)

(72) Inventors: Brian James Mulford, Rolling Hills Estates, CA (US); T. J. Gaffney, Mountain View, CA (US); Michael John De Ridder, Sunnyvale, CA (US); Colby D. Ranger, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/043,576

(22) PCT Filed: Nov. 27, 2019

(86) PCT No.: PCT/US2019/063722
§ 371 (c)(1),
(2) Date: Sep. 29, 2020

(87) PCT Pub. No.: WO2021/107957
PCT Pub. Date: Jun. 3, 2021

(65) Prior Publication Data
US 2022/0286753 A1    Sep. 8, 2022

(51) Int. Cl.
*H04N 21/647* (2011.01)
*H04N 21/24* (2011.01)
(Continued)

(52) U.S. Cl.
CPC ... *H04N 21/64738* (2013.01); *H04N 21/2407* (2013.01); *H04N 21/2408* (2013.01);
(Continued)

(58) Field of Classification Search
CPC ............ H04N 7/17318; H04N 21/472; H04N 21/64723; H04N 21/466; H04N 21/44213; H04N 21/4662; H04N 21/4532
See application file for complete search history.

(56) References Cited

U.S. PATENT DOCUMENTS

| | | | |
|---|---|---|---|
| 7,558,865 B2 | 7/2009 | Lin et al. | |
| 2014/0254776 A1* | 9/2014 | O'Connor | H04M 3/5175 379/265.06 |

(Continued)

OTHER PUBLICATIONS

International Search Report and Written Opinion for International Application No. PCT/US2019/063722, dated Jul. 21, 2020, 17 pages.

(Continued)

*Primary Examiner* — Jason Salce
(74) *Attorney, Agent, or Firm* — Lowenstein Sandler LLP

(57) ABSTRACT

A system and method are disclosed for identifying a plurality of past videos posted via a first group of channels, determining, for each channel of a second group, an average number of access requests that a future video to be posted via a respective channel is predicted to receive within a first time interval after posting, determining, for each channel of the second group, a plurality of adjusted average numbers of access requests that the future video to be posted via the respective channel of the second group is predicted to receive within the first time interval, wherein each of the plurality of adjusted average numbers of access requests is determined using an adjustment factor reflecting a number of access requests received by a past video posted via a respective channel of the first group, and determining whether the second group of channels satisfies a predetermined access criterion.

21 Claims, 8 Drawing Sheets

(51) Int. Cl.
*H04N 21/25* (2011.01)
*H04N 21/262* (2011.01)
*H04N 21/472* (2011.01)

(52) U.S. Cl.
CPC ..... *H04N 21/251* (2013.01); *H04N 21/26216* (2013.01); *H04N 21/47202* (2013.01)

(56) References Cited

U.S. PATENT DOCUMENTS

2018/0157733 A1* 6/2018 Liu .................. G06F 16/958
2018/0157757 A1* 6/2018 Liu .................. H04L 67/535
2018/0167472 A1* 6/2018 Liu .................. H04L 67/535
2019/0149863 A1  5/2019 Ewis et al.

OTHER PUBLICATIONS

Hoiles, William, "Engagement and Popularity Dynamics of YouTube Videos and Sensitivity to Meta-Data", IEEE Transactions on Knowleged and Data Engineering, IEEE Service Center, Lost Alamitos, CA, US, vol. 29, No. 7, Jul. 1, 2017, pp. 1426-1437, CP011651531, ISSN: 10041-4347, DOI: 10.1109/TKDE.2017.2682858 [retrieved on Jun. 2, 2017].

Richier, Cedric et al., "Predicting Populairty Dynamics of Online Contents Using Data Filtering Methods", 54th Annual Allerton Conference on Communication, Control, and Computing (Allerton), IEEE, Sep. 27, 2016, pp. 31-38, XP033065330, DOI: 10.1109/Allerton.2016.7852207 [retrieved on Feb. 10, 2017].

* cited by examiner

Identify a plurality of past videos posted via by a first group of channels during a historical time interval
510

Determine, for each channel of a first group of channels, an average number of access requests that a future video to be posted via a respective channel of the first group is predicted to generate within a first time interval after posting
520

Determine, for each channel of the second group, a plurality of adjusted average numbers of access requests that the future video to be posted via the respective channel of the second group is predicted to generate within the first time interval after posting, using adjustment factors based on numbers of access requests generated by the past videos posted via channels of the first group
530

Determine whether the second group of channels satisfies a predetermined viewership criterion based on the plurality of adjusted average numbers of access requests for each channel of the second group of channels
540

Determine the channel lineup percentile representing the fraction of the possible outcomes whose access view count exceeds the benchmark probability
550

FIG. 5

SYSTEM AND METHOD FOR MODELLING ACCESS REQUESTS TO MULTI-CHANNEL CONTENT SHARING PLATFORMS

TECHNICAL FIELD

Aspects and implementations of the present disclosure relate to simulation of user access requests for future videos posted via multi-channel arrays based on historical data reflecting dynamic access requests for past videos posted via various channels of the array.

BACKGROUND

Videos may be posted to a variety of online resources, which may include video-hosting services, social-networking media, online search engines, and so on. Some channels, such as those maintained by a particular party, may post videos relating to a number of other parties. The breadth of channels and actors involved in the posting of videos can present problems in modelling likely future access to those videos.

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

The subject matter of the disclosure relates to predicting a number of access requests that future videos posted via a set of channels—a prospective channel lineup—may receive in the future. The prediction may be based on a number of access requests that past videos posted via the same or a different set of channels—a reference channel lineup—have received in the past. The reference channel lineup may include more channels than the prospective channel lineup, in some implementations, to ensure a larger statistical set from which predictions can be made. In some implementations, a predictive model may first be used to predict a number of future access requests that a video posted via a specific channel may receive over some time after posting, based on one or more predictive features of this specific channel. Additionally, a number of simulations may be performed where the predictive model may be applied to randomly selected videos posted via the reference channel lineup and the predictions of the model may be compared with actual numbers of access requests received by the selected videos in the past. The ratios of the actual numbers of access requests received to the numbers predicted by the model may be used as (simulation-specific) adjustment factors to correct the predictions of the model when applied to the future videos to be posted via the prospective channel lineup. Furthermore, statistical analysis of such multiple simulations may be used to determine one or more probabilities that the prospective channel lineup will receive one or more benchmark numbers of access requests. This, in turn, may be used in determining a nature and an amount of resources that need to be allocated to various channels to ensure that access requests to the future videos are properly enabled.

According to one aspect of the present disclosure there is provided a method comprising: identifying, by a processing device, a plurality of past videos posted via a first group of channels during a historical time interval, wherein each channel of the first group of channels comprises at least one of the plurality of past videos, and wherein the first group of channels has at least one common characteristic with a second group of channels.

The method may also comprise: determining, for each channel of the second group of channels, an average number of access requests that a future video to be posted via a respective channel of the second group is predicted to receive within a first time interval after posting.

The method may also comprise: determining, for each channel of the second group of channels, a plurality of adjusted average numbers of access requests that the future video to be posted via the respective channel of the second group is predicted to receive within the first time interval after posting, wherein each of the plurality of adjusted average numbers of access requests is determined using an adjustment factor that is based on a number of access requests received by a past video, from the plurality of past videos, posted via a respective channel of the first group.

The method may also comprise: determining whether the second group of channels satisfies a predetermined access criterion based on the plurality of adjusted average numbers of access requests for each channel of the second group of channels.

According to another aspect of the present disclosure there is provided a system comprising one or more apparatus, the one or more apparatus configured to carry out the method described herein above. The system may comprise a memory and a processing device coupled to the memory, the processing device to perform various actions of "identifying" and "determining."

According to another aspect of the present disclosure there is provided a non-transitory computer-readable medium to store instructions, which when executed by a processing device, cause the processing device to carry out the method described herein above.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

FIG. 5 depicts a flow diagram of aspects of a method for predicting access requests of future videos posted via a prospective channel lineup having multiple channels, in accordance with some implementations of the present disclosure.

DETAILED DESCRIPTION

Figure 1:
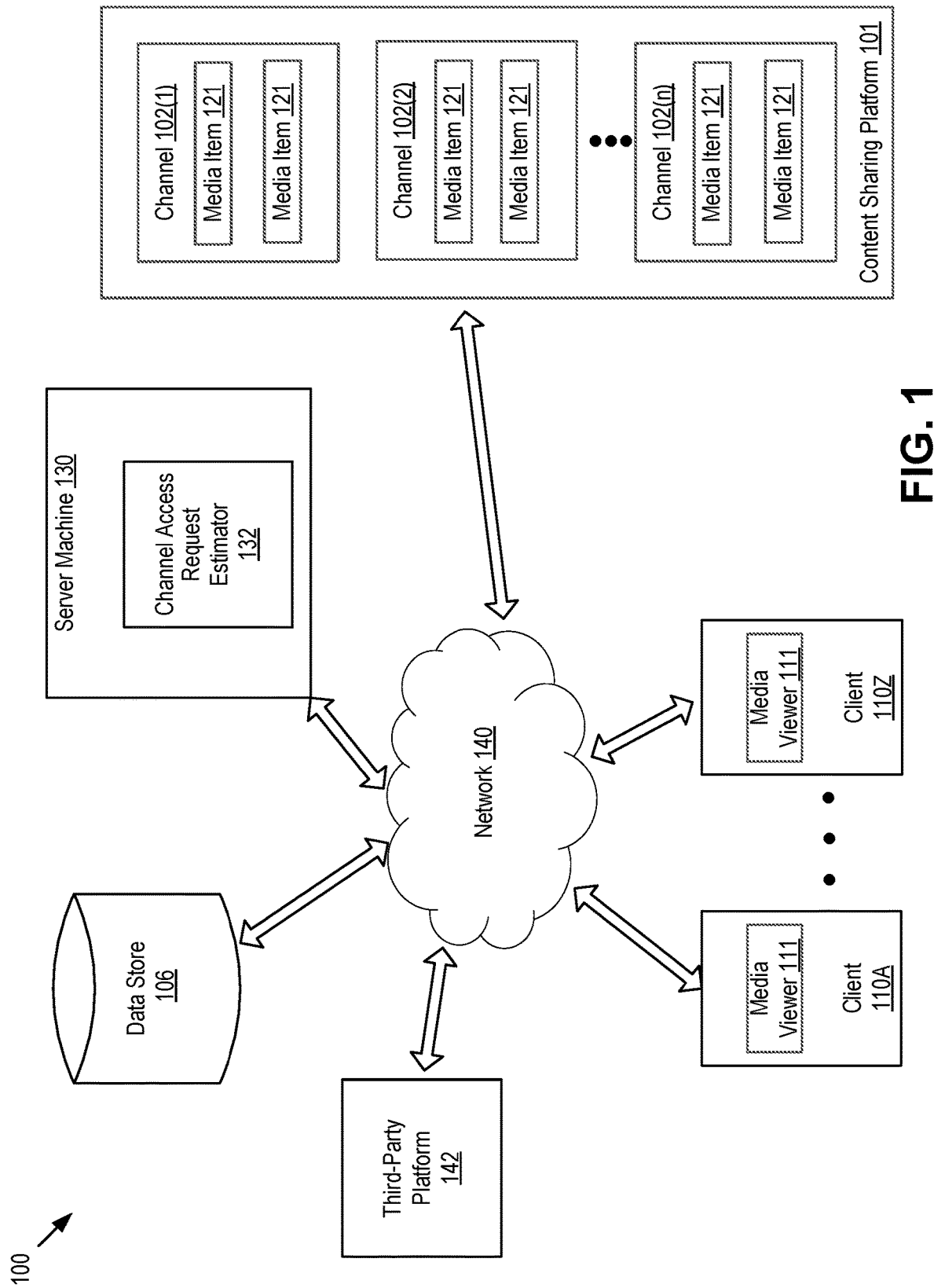
FIG. 1 illustrates an example system architecture, in accordance with one implementation of the present disclosure.

Access requests of organic (and, in some implementations, promotional) videos may have significant variations between different videos even when posted via the same channel. Some videos may receive relatively few access requests whereas other videos from the same producer may receive significantly larger numbers of access requests. This makes it a challenging problem to predict accurately potential access requests for future videos developed and posted via a particular producer.

A technical problem addressed by implementations of the disclosure is how to ascertain the likelihood that a given lineup (array, group) of channels, having at least one future video posted via each of the channels of the lineup, will cause there to be access requests to access at least one future video (within a certain interval of time after posting) that exceeds a benchmark number. Additionally, some implementations of the disclosure may allow predicting a median number (or any other percentile) of access requests for at least one video that a given lineup of channels is likely to receive. Such information may facilitate efficient allocation of computing resources (servers, network bandwidths, gateways, and so on) among various video channels and/or providers of video channels.

Aspects and implementations of the present disclosure describe a system and a method to implement a model predictive of future access requests of a prospective lineup of channels based on the historical access requests of past videos posted via channels of a reference lineup of channels which may be the same or different than the prospective lineup of channels. Implementations disclosed herein may identify a predictive model having a number of features $X_j$ that may be representative of access requests (within some specific time interval after posting) of a video posted via a given channel. Implementations disclosed herein may further identify a number of parameters $B_j$ representing a respective weight of each of the number of features $X_j$ predictive of the number of access requests that a posted video is likely to receive. Implementations disclosed herein may determine values of the parameters $B_j$ based on a statistical comparison of the predictions of the model with historical data for the channels of the reference lineup. The historical data for a channel of the reference lineup may include information about access requests received by the past videos posted via the channel. Implementations disclosed herein further include receiving a prospective channel lineup that may include n channels that are being considered as a venue for publication of N future videos. Based on the predictive model having determined parameters $B_j$ characterizing weight of the features $X_j$, implementations disclosed describe performing multiple simulations to improve the predictions of the model by selecting a number of N past videos posted via the reference channel lineup, and determining adjustment factors for the selected past videos by comparing the predictions of the model with the actual historical data for the selected past videos. Implementations disclosed further describe using the results of the multiple simulations to predict potential access requests of the N future videos, if those N future videos are to be posted to the prospective channel lineup.

FIG. 1 illustrates an example system architecture 100, in accordance with one implementation of the present disclosure. The system architecture 100 (also referred to as "system" herein) includes a content sharing platform 101, one or more server machines 130, a data store 106, and client devices 110A-110Z connected to a network 140.

In implementations, network 103 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In implementations, data store 106 is a persistent storage that is capable of storing content items (such as media items) as well as data structures to tag, organize, and index the content items. Data store 106 may be hosted by one or more storage devices, such as main memory, magnetic or optical storage based disks, tapes or hard drives, NAS, SAN, and so forth. In some implementations, data store 106 may be a network-attached file server, while in other embodiments data store 106 may be some other type of persistent storage such as an object-oriented database, a relational database, and so forth, that may be hosted by content sharing platform 101 or one or more different machines coupled to the server content sharing platform 101 via the network 140.

The client devices 110A-110Z may each include computing devices such as personal computers (PCs), laptops, mobile phones, smart phones, tablet computers, netbook computers, network-connected televisions, etc. In some implementations, client devices 110A through 110Z may also be referred to as "user devices." In implementations, each client device includes a media viewer 111. In one implementation, the media viewers 111 may be applications that allow users to view or upload content, such as images, video items, web pages, documents, etc. For example, the media viewer 111 may be a web browser that can access, retrieve, present, and/or navigate content (e.g., web pages such as Hyper Text Markup Language (HTML) pages, digital media items, etc.) served by a web server. The media viewer 111 may render, display, and/or present the content (e.g., a web page, a media viewer) to a user. The media viewer 111 may also include an embedded media player (e.g., a Flash® player or an HTML5 player) that is embedded in a web page (e.g., a web page that may provide information about a product sold by an online merchant). In another example, the media viewer 111 may be a standalone application (e.g., a mobile application or app) that allows users to view digital media items (e.g., digital video items, digital images, electronic books, etc.). According to aspects of the disclosure, the media viewer 111 may be a content sharing platform application for users to record, edit, and/or upload content for sharing on the content sharing platform. As such, the media viewers 111 may be provided to the client devices 110A-110Z by the server machine 130 or content sharing platform 101. For example, the media viewers 111 may be embedded media players that are embedded in web pages provided by the content sharing platform 101. In another example, the media viewers 111 may be applications that are downloaded from the server machine 130.

In one implementation, the content sharing platform 101 or server machine 130 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. For example, the content sharing platform 101 may allow a user to consume, upload, search for, approve of ("like"), disapprove of ("dislike"), or comment on media items. The content sharing platform 101 may also include a website (e.g., a webpage) or application back-end software that may be used to provide a user with access to the media items.

In implementations of the disclosure, a "user" may be represented as a single individual. However, other implementations of the disclosure encompass a "user" being an entity controlled by a set of users and/or an automated source. For example, a set of individual users federated as a community in a social network may be considered a "user". In another example, an automated consumer may be an automated ingestion pipeline, such as a topic channel, of the content sharing platform 101.

The content sharing platform 101 may include multiple channels (e.g., channels A through Z). A channel can be data content available from a common source or data content having a common topic, theme, or substance. The data content can be digital content chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. The concept of "subscribing" may also be referred to as "liking", "following", "friending", and so on.

Once a user subscribes to a channel, the user can be presented with information from the channel's activity feed. If a user subscribes to multiple channels, the activity feed for each channel to which the user is subscribed can be combined into a syndicated activity feed. Information from the syndicated activity feed can be presented to the user. Channels may have their own feeds. For example, when navigating to a home page of a channel on the content sharing platform, feed items produced by that channel may be shown on the channel home page. Users may have a syndicated feed, which is a feed including at least a subset of the content items from all of the channels to which the user is subscribed. Syndicated feeds may also include content items from channels that the user is not subscribed. For example, the content sharing platform 101 or other social networks may insert recommended content items into the user's syndicated feed, or may insert content items associated with a related connection of the user in the syndicated feed.

Each channel may include one or more media items 121. Examples of a media item 121 can include, and are not limited to, digital video, digital movies, digital photos, digital music, audio content, melodies, website content, social media updates, electronic books (ebooks), electronic magazines, digital newspapers, digital audio books, electronic journals, web blogs, real simple syndication (RSS) feeds, electronic comic books, software applications, etc. In some implementations, media item 121 is also referred to as content or a content item.

A media item 121 may be consumed via the Internet or via a mobile device application. For brevity and simplicity, a video item is used as an example of a media item 121 throughout this document. As used herein, "media," media item," "online media item," "digital media," "digital media item," "content," and "content item" can include an electronic file that can be executed or loaded using software, firmware or hardware configured to present the digital media item to an entity. In one implementation, the content sharing platform 101 may store the media items 121 using the data store 106. In another implementation, the content sharing platform 101 may store video items or fingerprints as electronic files in one or more formats using data store 106.

In one implementation, the media items 121 are video items (videos). A video item is a set of sequential video frames (e.g., image frames) representing a scene in motion. For example, a series of sequential video frames may be captured continuously or later reconstructed to produce animation. Video items may be presented in various formats including, but not limited to, analog, digital, two-dimensional and three-dimensional video. Further, video items may include movies, video clips or any set of animated images to be displayed in sequence. In addition, a video item may be stored as a video file that includes a video component and an audio component. The video component may refer to video data in a video coding format or image coding format (e.g., H.264 (MPEG-4 AVC), H.264 MPEG-4 Part 2, Graphic Interchange Format (GIF), WebP, etc.). The audio component may refer to audio data in an audio coding format (e.g., advanced audio coding (AAC), MP3, etc.). It may be noted GIF may be saved as an image file (e.g., .gif file) or saved as a series of images into an animated GIF (e.g., GIF89a format). It may be noted that H.264 may be a video coding format that is block-oriented motion-compensation-based video compression standard for recording, compression, or distribution of video content, for example.

In implementations, content sharing platform 101 may allow users to create, share, view or use playlists containing media items (e.g., playlist A-Z, containing media items 121). A playlist refers to a collection of media items that are configured to play one after another in a particular order without any user interaction. In implementations, content sharing platform 101 may maintain the playlist on behalf of a user. In implementations, the playlist feature of the content sharing platform 101 allows users to group their favorite media items together in a single location for playback. In implementations, content sharing platform 101 may send a media item on a playlist to client device 110 for playback or display. For example, the media viewer 111 may be used to play the media items on a playlist in the order in which the media items are listed on the playlist. In another example, a user may transition between media items on a playlist. In still another example, a user may wait for the next media item on the playlist to play or may select a particular media item in the playlist for playback.

Server machine 130 includes a channel access request estimator 132 that is capable of prediction future access requests of a prospective lineup of channels, as described in detail below with respect to FIGS. 2 and 3.

It should be noted that in some other implementations, the functions of the server machine 130 and the content sharing platform 101 may be provided by a single machine. In general, functions described in one implementation as being performed by the content sharing platform 101 and server machine 130 can also be performed on the client devices 110A through 110Z in other implementations, if appropriate. In addition, the functionality attributed to a particular component can be performed by different or multiple components operating together. The content sharing platform 101 and the server machine 130 can also be accessed as a service provided to other systems or devices through appropriate application programming interfaces, and thus is not limited to use in websites.

Although implementations of the disclosure are discussed in terms of content sharing platforms and promoting social network sharing of a content item on the content sharing platform, implementations may also be generally applied to any type of social network providing connections between users. Implementations of the disclosure are not limited to content sharing platforms that provide channel subscriptions to users.

In situations in which the systems discussed here collect personal information about users, or may make use of personal information, the users may be provided with an opportunity to control whether the content sharing platform 101 collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content sharing platform 101.

Figure 2:
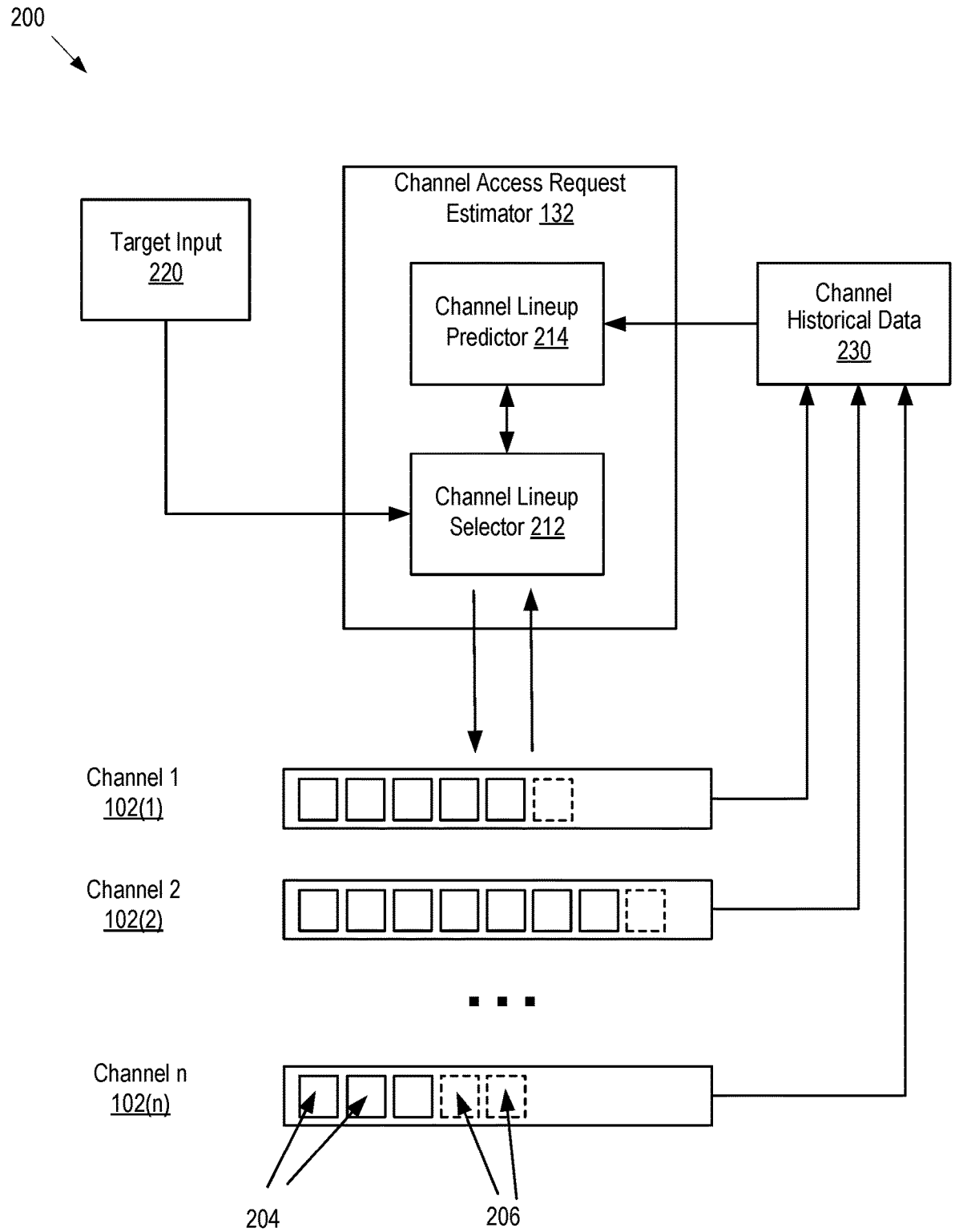
FIG. 2 illustrates an example architecture of a channel access request estimator for predicting access requests of future videos posted via a prospective channel lineup having multiple channels, in accordance with some implementations of the present disclosure.

FIG. 2 illustrates an example architecture 200 of a channel access request estimator for predicting access requests of future videos posted via a prospective channel lineup having multiple channels, in accordance with some implementations of the present disclosure. The prospective channel lineup may include n channels 102(1), 102(2) . . . 102(n). The system architecture 100 may include a channel access request estimator 132 having a channel lineup selector component 212 and a channel lineup predictor component 214 communicatively coupled to each other.

The channels 102(1), 102(2) . . . 102(n) may be capable of hosting content items, which may be any pre-recorded or live-streaming data capable to be sensed by a user, such as a video, an audio, an animated image, a static image, a text, or any combination thereof, and so on. For brevity and simplicity, "video" is used throughout the rest of this document to refer to any media items (content items) that may be posted via the channels 102 that can be accessed and sensed (consumed) by users.

The videos may be provided by content providers, such as a company, an organization, another user, etc. Some of the content providers may have one of more dedicated channels 102. Some of the content providers may share one or more channels 102. Videos posted via these channels may include a variety of materials, such as commercial materials, political materials, educational materials, and so on. For example, a video may be an advertisement for a car provided by a car advertiser, or a political campaign material, etc.

The channel lineup selector 212 may select the channel lineup having specific channels 102(1), 102(2) . . . 102(n). The channels may be selected from a pool of available channels. The size of the pool of channels established by the channel lineup selector 212 may depend on the target input 220. The target input 220 may include the number of future videos N that is to be posted, the type of the product(s) to be referenced, the type and style of the videos, and so on. The target input 220 may include the total number of access requests G that N future videos are expected to receive over some specific time interval after their publication, in some implementations. A human operator, based on the objectives of a provider of channels/videos, may be providing the target input 220.

The channel lineup selector 212 may select various combinations of n prospective channels from available channels. The selection of prospective channels may be done randomly, in some implementations, or may be based on rankings according to the metrics describe above in relation to the composition of the pool of channels, in other implementations. In some implementations, the channel lineup selector 212 may select the n channels from a fixed database (e.g., a list) of available channels. In some implementations, the channel lineup selector 212 may dynamically (e.g., at pre-set times or upon receiving the target input 220) update the list of available channels. The channel lineup selector 212 may select one or multiple lineups (sets of n prospective channels) and provide the selections to the channel lineup predictor component 214 for processing consistent with the present disclosure, as described in more details below. In some implementations, the channel lineup selector 212 and the channel lineup predictor 214 may be implemented as a single module (e.g., a software module) of the channel access request estimator 132. In some implementations, all or some parts of the tasks, which are described as performed by the channel lineup selector 212, may instead be carried out by a human operator.

The channel lineup predictor 214 may have access to the channel historical data 230 that may be stored within a memory of the server machine 130 or on a cloud. The channel historical data 230 may include information about past videos 204 (depicted with solid squares) posted via various channels 102. In some implementations, the channel historical data 230 may include the times of publication of the past videos 204. In some implementations, the channel historical data 230 may include dynamic information about the number of access requests the past videos 204 received within some time period(s) after posting, such as within the first day, the second day, etc., the first week, the second week, etc., the first month, the second month, etc. In some implementations, the channel historical data 230 may include histograms (or other dynamic representations) indicating the number of hits (access requests) that a video received after posting within each time period. In some implementations, the channel historical data 230 may include classification of access requests based on the duration of the access requests. For example, a video that was viewed for less than 10 seconds (20 seconds, or any other duration) may be not counted or counted as a reduced number. In some implementations, a sliding scale may be used, e.g., a video viewed for its full duration may be counted as a full (1.0) access request, a video viewed over 30 seconds but less than the full duration may be counted as 0.8 access requests, between 20 and 30 seconds as 0.5 access requests, between 10 and 20 seconds as 0.25 access requests and so on. In some implementations, the video watched for 80% of its duration may be counted as 1.0 access request, whereas a video that is watched for its entire duration may be counted higher than the full access request (e.g., at 1.25 views). In some implementation, the access requests may be counted as the total (continuous or quasi-continuous) time of watching, measured in units of time (e.g., seconds) rather than in the number of hits. A virtually unlimited number of schemes may be devised with specific implementations how access requests are counted.

The channel lineup predictor 214 may use the channel historical data 230 to predict access requests of future videos 206 (depicted by dashed squares) that may be posted into the n channels, as described in more detail below. In some implementations, the number of future videos to be posted is equal to the number of channels, N=n. In some implementations, the number of videos may exceed the number of channels, N>n, with more than one video to be posted to at least one of the channels. A set of channels generated by the channel lineup generator 212 may include the number of videos $m_j$ to be posted via the j-th channel ($1 \leq j \leq n$, such that $N = \Sigma_{j=1}^n m_j$) Accordingly, the output of the channel lineup generator 212, which is to be input to the channel lineup predictor 214, may include (1) identification of each of the n channels, and (2) the number of videos $m_j$ for each of the channels. The channel lineup predictor 214 may view two inputs having the same channels as two distinct tasks, if the two inputs differ in at least some of the numbers $m_j$. For example, the channel lineup predictor 214 may view as two different channel lineups two tasks where (1) channel 102(1) is to post one video and channel 102(2) is to post two videos, (2) channel 102(1) is to post two videos and channel 102(2) is to post one video. Correspondingly, the channel lineup predictor 214 may generate two separate outputs describing the probability that each of the input channel lineups will exceed the benchmark number of access requests G (or separate probabilities that each of the input channel lineups will exceed the benchmark numbers of access requests $G_1$, $G_2$, $G_3$ . . . ). The benchmark number G may serve as an indicator of the need to allocate more resources to the servers that support the channels. For example, is a probability that the number of access requests will exceed the benchmark number G with a certain threshold probability (e.g., 50%, 75%), additional resources may be allocated to the provider(s) of the channel lineup. In some implementations, where there are multiple benchmark numbers $G_1$, $G_2$, $G_3$ . . . , allocation of resources may depend on how many benchmark numbers are exceeded, with minimal additional resources allocated if the first benchmark number $G_1$ is exceeded with a certain pre-determined probability, more additional resources allocated if the second benchmark number $G_2$ is exceeded, and so on.

Figure 3:
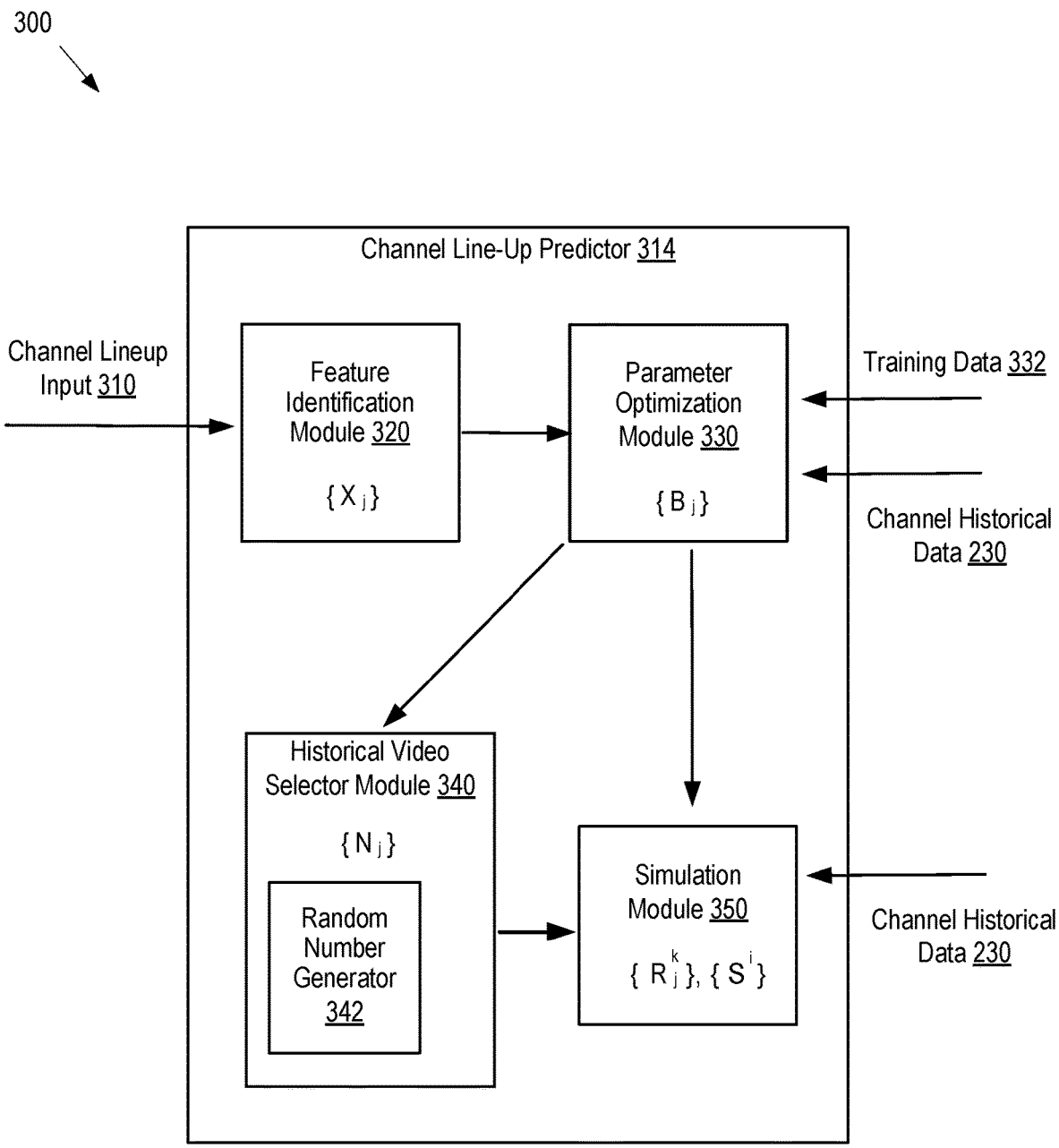
FIG. 3 illustrates exemplary functionality of the channel lineup predictor for predicting future access requests of a prospective channel lineup, in accordance with implementations of the present disclosure.

FIG. 3 illustrates exemplary functionality of the channel lineup predictor 314 for predicting future access requests of a prospective channel lineup, in accordance with implementations of the present disclosure. Various modules shown in FIG. 3 may be implemented in software, firmware, and/or hardware. Various modules shown in FIG. 3 may be implemented as separate modules (components), in some implementations. In some implementations, functions of one or more modules shown in FIG. 3 may be implemented within a single component.

The feature identification module 320 may receive the channel lineup input 310, which may be the output of the channel lineup selector 212, as described above. The channel lineup input 310 may include a prospective channel lineup. The channel lineup input 310 may also include a reference channel lineup. In some implementations, the reference channel lineup may include more channels than the prospective channel lineup. This may allow to take advantage of large statistical (historical) data available for the channels of the reference channel lineup to make more accurate predictions for the prospective channel lineup. In some implementations, e.g., in situations where the prospective channel lineup has many channels and/or many video posted to various channels of the prospective lineup, the reference channel lineup may be the same as the prospective channel lineup. In some implementations, the reference channel lineup may include some or all of the channels of the prospective channel lineup and also include additional channels. In some implementations, the reference channel lineup may have fewer channels than the prospective channel lineup.

The reference channel lineup may be selected on the basis of at least one or more common characteristic(s) shared with the prospective channel lineup. For example, a shared characteristic may be a same channel size category for some channels in the reference lineup and the prospective lineup. The channel size category (e.g., "small," "medium," "large," "extra-large," and the like) may be determined by the number of access requests (e.g. average number of access requests per video of a channel) that qualified past videos of the channel received over some time interval, as described in more detail below. Another shared characteristic may be a distribution of the channels of the two lineups over various channel size categories. For example, if the prospective channel lineup has 20% of channels in the "small" category, 15% of channels in the "medium category," 43% of channels in the "large" category, 6% in the "extra-large" category, and so on, the reference channel lineup may similarity have 20% (plus/minus a pre-determined tolerance level of, e.g., 3%) of channels in the "small" category (plus/minus the tolerance level), 15% of channels in the "medium category" (plus/minus the tolerance level), 43% of channels in the "large" category (plus/minus the tolerance level), 6% in the "extra-large" category (plus/minus the tolerance level), and so on.

The feature identification module 320 may identify a predictive model to predict an average number of access requests that a video posted to a channel (of the prospective lineup, prospectively, and of the reference lineup, retroactively) will receive over the first time interval $T_1$ after posting of the video. In one possible implementation, a model (herein referred to as "Model 1") may express the logarithm of the predicted average number of access requests P as a linear combination of a set of features $\{X_1\}$:

$$P = \exp(B_0 + B_1 X_1 + B_2 X_2 + \ldots).$$

A feature $X_1$ may be an averaged—over a predictive set of posted videos of the channel—value of the logarithm, $X_1 = \langle \ln A(T_H) \rangle$, of the actual number of access requests that a video posted via the channel during some historical time interval $T_H$ receives within the next $T_1$ days after posting of the video.

Figure 4A:
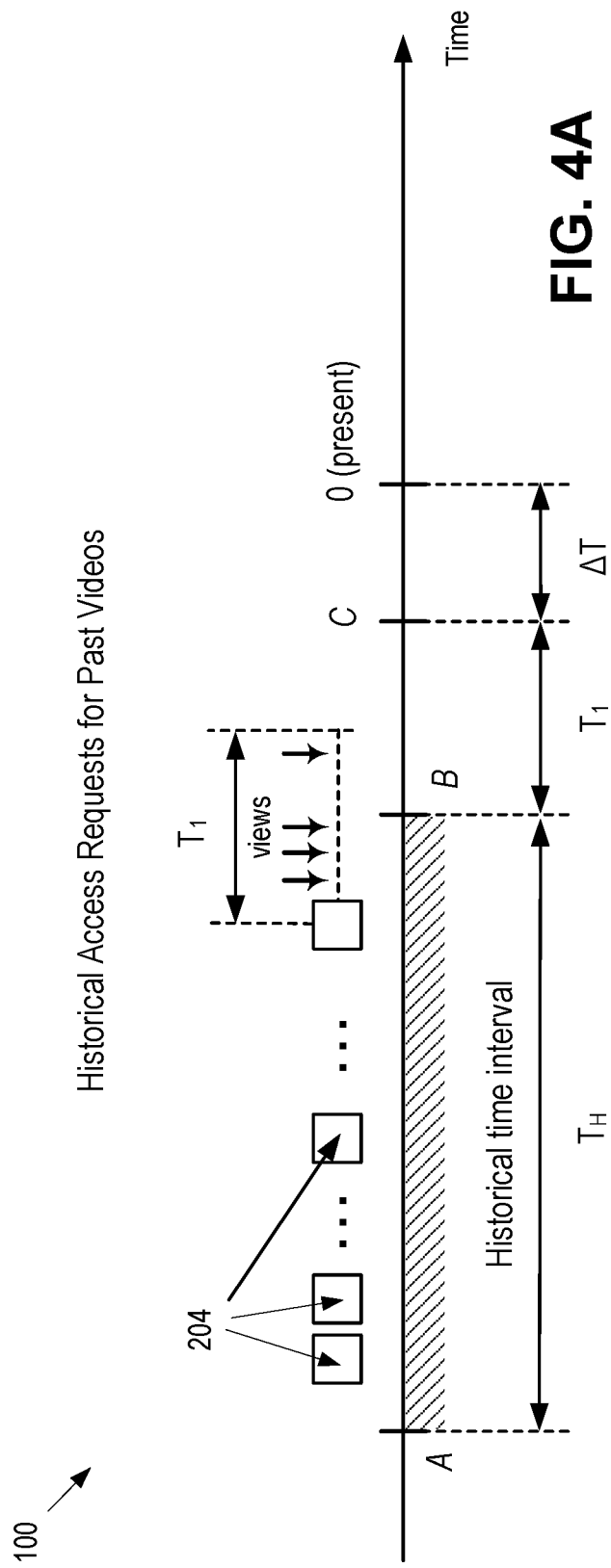
FIG. 4A illustrates a time diagram depicting how access requests of past videos posted during a historical time interval may be counted, in accordance with one implementation of the present disclosure.

FIG. 4A illustrates a time diagram depicting how access requests of past videos posted during a historical time interval may be counted, in accordance with one implementation of the present disclosure. Illustrated in FIG. 4A is a historical time interval that commences at time A in the past and concludes at time B. Access requests of each of the videos 204 posted during the historical time interval AB (having duration $T_H$) may be collected during the time interval $T_1$, beginning at the moment of time the video is posted. For example, access requests of a video that was posted right at the beginning of the historical time interval A may include access requests received by the video within the time interval between A and $A+T_1$. Similarly, access requests of another video that was posted near the end of the historical time interval B may include access requests received by that video within the time interval between B and $B+T_1$, until time C.

In one illustrative implementation, $T_1=1$ month and $T_H=3$ months, but any other time intervals may be used instead. In some implementations, the historical time interval may begin at the moment of time $-T_H-T_1$ in the past and end at the moment $-T_1$. This may allow to count all hits to a video posted near the end of the historical time interval, so that all videos of the predictive set of posted videos are posted for at least $T_1$ days prior to the present moment of time, which is depicted as t=0 in FIG. 4A. In some implementations, the historical time interval may start earlier than $-T_H-T_1$ (e.g., at $-T_H-T_1-\Delta T$) and end prior to moment $-T_1$ (e.g., at $-T_1-\Delta T$).

In some implementations, the predictive set of posted videos of the channel (over which the average of the logarithm of the number of access requests is taken) may include all videos that had been posted during the historical time interval. In some implementation, the predictive set may include only a subset of all posted videos. For example, included in the set may only be the videos having a certain design, duration, referencing similar content to the content that the N future videos are expected to have, and so on.

The features $X_2$, $X_3$, $X_4$ . . . may include some of the following:
- a standard deviation of the logarithm of the number of access requests that a video posted during the historical time interval $T_H$ into the channel receives over the next $T_1$ days after posting of the video;
- an average age of a video in the channel (at some pre-determined moment during the historical time interval, e.g., in the middle or at the end of the historical time interval);
- a minimum number of access requests per any $T_2$ period for all (or some subset of) videos posted within some time interval $T_3$ (which may be the historical time interval $T_H$) that have been posted for at least $T_4$ days (e.g., a minimum number of access requests per any 30-day period for all videos posted within the last year but no later than 30 or 60 days ago);
- whether a video is sponsored or not, etc.

Some of the features $X_j$ may apply "globally" to the channel, if the feature is the same across all relevant videos (e.g., all videos belonging to the predictive set of videos) of the channel. For example, an age of an average video in the channel and a minimum number of access requests of a video in the channel may be such global features. Some of the features may be "local," in a sense that they may be specific to a particular video and differ for different videos of the same channel. For example, a feature $X_4$ may take value 0, if the video is non-sponsored and take value 1 if the video is sponsored.

A set of parameters (coefficients) $\{B_j\}=B_0, B_1, B_2 \ldots$ may represent weights of the respective features $X_j$. The parameters $\{B_j\}$ may be determined by the parameter optimization module 330 from fitting training data 332 (which may be separate from the channel historical data 230 or may be a part of the channel historical data 230, depending on a specific implementation) to the predictions of the model identified by the feature identification module 320. In some implementations, a bias coefficient $B_0$ may assume different values (to be determined from fitting to the historical data) depending on a channel size category. The channel size category (e.g., "small," "medium," "large," "extra-large," and the like) may be determined by the number of access requests (e.g. average number of access requests per video) that qualified past videos of the channel received over some time interval $T_2$. In some implementations, the coefficient $B_1$ may also assume different values depending on a channel size category.

In some implementations, the time interval $T_2$ may have the same duration as the time interval $T_1$. The qualified past videos may be those videos of the channel that were posted within some time interval $T_3$. In some implementations, the time interval $T_3$ may be the historical time interval AB and have the same duration $T_H$. In some implementation, the time interval $T_3$ may be different from the historical time interval AB but have the same duration $T_H$. For example, time interval $T_3$ may begin earlier than the historical time interval and have a partial overlap with the historical time interval. The time interval $T_3$ may have no overlap with the historical time interval AB (having started and ended prior to the beginning of the historical time interval). In some implementations, the time interval $T_3$ may start after the end of the historical time interval AB.

In some implementations, there may be an integer number of non-overlapping time intervals $T_2$ that may be selected within the time interval $T_3$ (for the total of $T_2/T_3$ intervals). In such implementations, the channel size category may be determined by the average number of access requests received across multiple (two or more) time intervals $T_2$ within the time interval $T_3$ (possibly, being subject to the "no later than time $T_4$" condition). For example, if $T_2=1$ month and $T_3=1$ year, the average number of access requests may be calculated across 12 periods of one month duration each. In some implementations, the qualified videos are those videos that had been posted for at least time $T_4$ prior to the start of the time interval $T_2$. For example, videos that have been posted for less than $T_4=3$ days, may be excluded.

Based on the average number of access requests per video that qualified past videos of the channel posted within the time interval $T_3$ and received over time interval(s) $T_2$, the parameter optimization module 330 may classify channels into their respective channel size categories. (For example, "extra-large" category may include channels with 600 k+ average access requests per qualified past video, "large" category may include channels with 300 k-600 k access requests per qualified video, "medium" category may include channels with 100 k-300 k access requests per qualified video, "small" category may include channels with less than 100 k access requests per qualified video.) Separate bias coefficients $B_0$ may be determined for each individual channel size category the parameter optimization module 330. The parameter optimization module 330 may define different number of channels size categories depending on the channel lineup input 310 (with, possibly, more categories to be used with increasing number n of the channels in the lineup.)

In some implementations, the feature identification module 320 may select a different predictive model ("Model 2") that may express the predicted average number of access requests P (rather than the logarithm of P) as a linear combination of the set of features $\{X_j\}$:

$$P = B_0 + B_1 x_1 + B_2 x_2 +$$

where $X_1 = \langle A(T_H) \rangle$ is the actual number of access requests that a video posted during the historical time interval $T_H$ into the channel receives over the next $T_1$ days after posting of the video. The other features $X_2, X_3, \ldots$, may be determined similar to the respective features of Model 1. In some implementations of Model 2, instead of the standard deviation of the logarithm of the number of access requests, the standard deviation of the number of access requests over the next $T_1$ days after posting of the video may be used as one of the features. The determination of the parameters $B_0, B_1, B_2$ may be performed in a similar way for the two models, as described below.

During a training phase, a parameter optimization module 330 may retrieve the training data 320 and select the predictive set of videos posted via the channel within the historical time interval. The predictive set of videos may include a number of videos posted at various times during the historical time interval. For each of the videos of the predictive set, the training data 230 may include a number of access requests received by the video during time $T_1$ days after its publication.

The parameter optimization module 330 may determine the values of the parameters $B_0, B_1, B_2 \ldots$ for the model selected (e.g., Model 1 or Model 2) from fitting an actual number of access requests that the past videos of the predictive set received within time $T_1$ after posting of the video to an average number of access requests P predicted by the selected model, for each of the videos of the predictive set. The fitting procedure may be performed by the parameter optimization module 330 using regression analysis methods, such as the least square error method, in one implementation. For example (although other regression schemes are possible), in one implementation, after determining the values $X_j(i)$ of the features $X_j$ and the actual numbers $P(i)$ for each of the videos (labeled with i) of the predictive set, the parameters $B_j$ for Model 1 may be determined from minimizing $\Sigma_i(\ln P(i) - \Sigma_j B_j X_j(i))^2$. In another implementation, the parameters may be determined (similarly for both Model 1 and Model 2) by minimizing $\Sigma_i(P(i) - \exp(\Sigma_j B_j X_j(i)))^2$. The fitting of parameters may be performed based on a training group of channels, each having a set of predictive videos. In some implementations, the training group of channels may have some partial overlap with the prospective channel lineup and/or the reference channel lineup or may include all channels of the prospective/reference channel lineups (plus some additional channels).

Figure 4B:
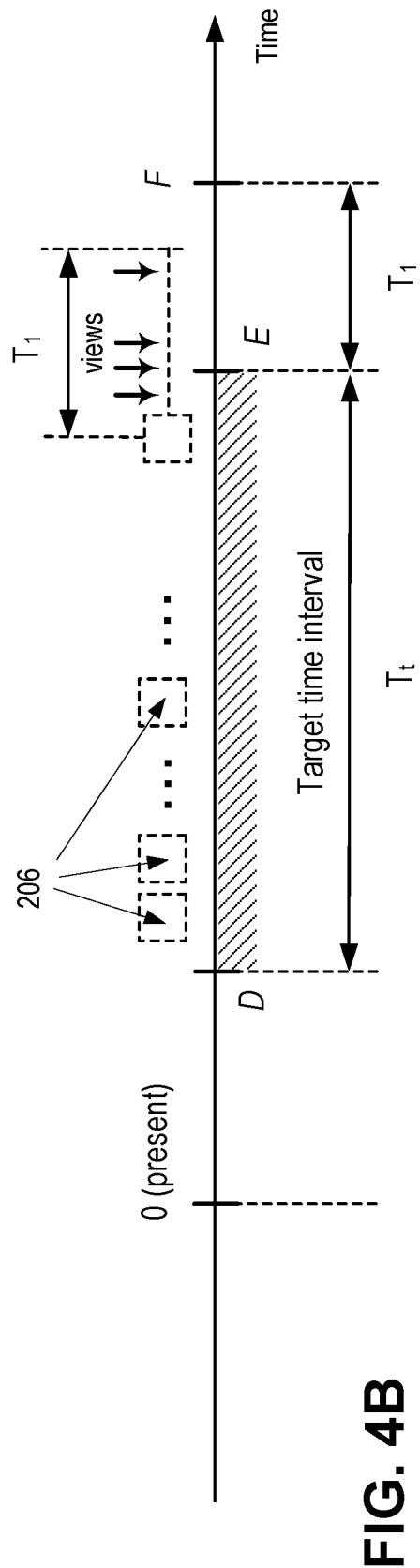
FIG. 4B illustrates a time diagram depicting how access requests of future videos to be posted during a target interval may be counted, in accordance with one implementation of the present disclosure.

FIG. 4B illustrates a time diagram depicting how access requests of future videos to be posted during a target interval may be counted, in accordance with one implementation of the present disclosure. Illustrated in FIG. 4B is a target time interval $T_t$ that commences at time D in the future and concludes at time E. Access requests of each of the future videos 206 to be posted during the target time interval DE may refer to the access requests that are expected to be received within the time interval $T_1$ after posting of the video. For example, access requests of a video that is to be posted right at the beginning of the target time interval D may include access requests received by the video within a time interval between D and $D+T_1$. Similarly, access requests of another video that is to be posted near the end of the target time interval E may include access requests received by that video within a time interval between E and $E+T_1$ (which is denoted as time F).

Once the selected model is trained and the parameters $B_0, B_1, B_2 \ldots$, are determined, the trained model may be used to predict prospective access requests for the future N videos, for each of the potential channel lineups identified by the channel lineup selector 212, and assess the probability with which the prospective channel lineups are to meet the target view count G. To predict the prospective access requests, the trained model may first be applied to determine an average number of access requests that each of the N future videos is to receive if $m_j$ videos are posted to the j-th channel (so that $\Sigma_{j=1}^n m_j = N$). The total number of access requests predicted for each video may be used as a starting point for predicting a likelihood that the prospective channel lineup will receive the target view count G.

However, this starting point may not be fully representative of the distribution of the potential outcomes. For example, even if the predicted average count exceeds the target count G, the likelihood that the prospective channel lineup will exceed the target count may still be below (in some instances, well below) 50%. This can happen, for example, because the access requests of the past videos used for training is skewed by a low number of highly viewed ("viral") videos. Accordingly, to better characterize the distribution of the prospective outcomes (rather than merely determine the respective average predicted access requests), the channel lineup predictor 214 may perform a plurality of Monte Carlo simulations, based on the reference channel lineup, as described below.

In some implementations, each or some of the simulations may include: selecting, by a historical video selector module 340, N past videos posted via the reference channel lineup, with $m_j$ videos selected from the j-th channel. In some implementations, the selection of the N past videos may be performed randomly, e.g., using a random number generator 342. Specifically, within a reference channel of the reference channel lineup, the random number generator 342 may select $m_j$ past videos posted during the historical time interval (e.g., $T_H$). For each of the selected N past videos, the simulation module 350 may apply the trained model and determine the predicted average number of access requests $P_j^{(i)}$ (PAST) that the past video from the reference channel j selected for the i-th simulation (indicated by the corresponding superscript) was likely to receive (according to the trained model) within the time $T_1$ after posting of the video.

The simulation module 350 may further access the channel historical data 230 and retrieve the actual number of access requests $A_j^{(i)}$ that the selected video of the reference channel received within the time $T_1$ interval after posting. The subscript j in the notations $P_{j,PAST}^{(i)}$ and $A_j^{(i)}$ enumerates the reference channel to which the selected past videos belong; in case there are $m_j$ such selected videos, the simulation module 350 may determine a pair of values $P_{j,PAST}^{(i)}$ and $A_j^{(i)}$ for each of $m_j$ selected videos.

The simulation module 350 may determine a (historical) adjustment factor, which may be the ratio of the actual number of access requests $A_j^{(i)}$ to the predicted number of access requests $P_{j,PAST}^{(i)}$ $$R_j^{(i)} = A_j^{(i)} / P_{j,PAST}^{(i)},$$

for each randomly selected past video. This ratio $R_j^{(i)}$ provides a quantitative estimate of how much the trained model may overestimate (underestimate) the actual past performance of the videos posted via the reference channel j for a given simulation i. The simulation module 350 may further determine the product $R_j^{(i)} * P_j$ of the historical adjustment factor $R_j^{(i)}$ and the number of the predicted access requests $P_j$ for the future time interval $T_1$. In this approach, the randomly chosen previously posted video serves as a benchmark for the accuracy of the predictions of the model and provides adjustments (error correction) to account for the difference between the predicted and actual access requests in a dynamic statistical manner.

The simulation module 350 may then sum over all channels of the selected (within the given simulation i) reference channel lineup to determine the total number of the access requests that n randomly selected videos are expected to receive (within the given simulation i) within the time interval $T_1$ after posting of the videos. For example, if one future video is to be posted per prospective channel ($m_j=1$), the total number of predicted adjusted access requests may be computed as follows:

$$S^{(i)} = \Sigma_{j=1}^{n} R_j^{(i)} * P_j.$$

In general, if $m_j$ videos are to be posted to the j-th channel of the prospective channel lineup and $m_j$ videos of the j-th reference channel of the reference channel lineup are selected as adjustment benchmarks, an additional summation may be performed for each j-th channel of the prospective channel lineup:

$$S^{(i)} = \Sigma_{j=1}^{n} \Sigma_{\{m_j\}} R_j^{(i)} * P_j.$$

The simulation module 350 may perform M simulations ($1 \leq l \leq M$) and determine the number of simulations $M_G$ in which the total count of access requests $S^{(l)}$ meets or exceeds the benchmark number of access requests G. The simulation module 350 may identify the share of simulations $M_G/M$ in which the total number of predicted adjusted access requests exceeds the benchmark number as the probability that the N future video posted to the prospective group of n channels will receive (within the target interval of time $T_1$ after posting) the total number of access requests that is equal to or exceeds the benchmark number:

$$W(G) = M_G/M.$$

The number of simulations M may be chosen sufficiently large to ensure an accurate determination of W. In some implementations, the number M may be a fixed large number, e.g., M=10,000. In other implementations, the number of simulation M may be task-specific. For example, the number of simulations may be such that the probability W is determined with a predetermined level of confidence, e.g., 95% confidence, in one implementation. For a large number of simulations, the difference between the obtained probability W and the "true" probability $W_\infty$ (that would have been determined if the number of simulations had been infinite) may be estimated to follow a normal distribution. The variance in the determination of W may then be estimated as $W(1-W)/M$. If the acceptable tolerance of an error $|W - W_\infty|$ is $\varepsilon$, it may possible to estimate the number of required simulations to achieve a pre-determined confidence level, such as the 95% confidence level, after M simulations provided that $$1.645 * \sqrt{\frac{W(1-W)}{M}} = \varepsilon \to M = W(1-W) * \left(\frac{1.645}{\varepsilon}\right)^2.$$

Because the probabilities W themselves may be affected by the number of simulations M chosen for their determination, the simulation module 350 may initially start with a fixed batch M of simulations (e.g., M=500, or some other number). The simulation module 350 may then determine an initial value W using this initial batch as described above, and extract from the last equation the number of simulations that may be required to achieve the set accuracy $\varepsilon$ with the required level of confidence. In some implementations, this procedure may be iteratively repeated more than once. The same procedure may be applied to obtain the minimum number of simulations required to determine multiple values $W(G_1)$, $W(G_2)$, $W(G_3)$, . . . with the set accuracy and the required level of confidence. The determined number of simulations M may be the maximum number of simulations of all the determined individual values of M determined for each of the probabilities $(G_1)$, $W(G_2)$, $W(G_3)$, . . . , in one implementation. This may ensure that the set accuracy and a pre-determined confidence level are met for all the probabilities.

The simulation module 350 may predict a target count $G(p)$ that corresponds to a given percentile p of possible outcomes. For example, in one implementation, the simulation module 350 may select the top percentile p of the determined simulations counts $S^{(1)}$, $S^{(2)}$, $S^{(3)}$ . . . , and ascertain the count that corresponds to the 50-th percentile, the 20-th percentile, and so on.

FIG. 5 depicts a flow diagram of aspects of a method 500 for predicting access requests of future videos posted via a prospective channel lineup having multiple channels, in accordance with some implementations of the present disclosure. The method 500 may be performed by a processing device that may comprise hardware (circuitry, dedicated logic, etc.), software (such as is run on a general purpose computer system or a dedicated machine), or a combination of both. In one implementation, the method 500 is performed by the channel access request estimator 132 of the server machine 130 of FIG. 1. In one implementation, a processing device of the server machine 130 performs method 500.

At block 510, the processing device may identify a plurality of past videos posted via a first group of channels (e.g., a reference channel lineup) during a historical time interval so that each channel of the first group of channels includes at least one of the plurality of past videos. The first group of channels may be identified by the channel lineup selector 212 after receiving a target input 220, e.g., from a third-party platform 142 (e.g., a person or an organization seeking an estimate of the number of access requests).

At block 520, the processing device may determine, for each channel of a second group of channels (e.g., the prospective channel lineup), an average number of access requests that a future video to be posted via a respective channel of the second group is predicted to receive within a first time interval (e.g., $T_1$) after posting. In some implementations, the first group of channels may have at least one common characteristic with the second group of channels. The first group of channels may be identified by the channel lineup selector 212 after the second group of channels is identified, e.g., based on the common characteristic(s) shared by the two groups of channels. In some implementations, determining the average number of access requests that the future video to be posted via the respective channel of the second group is predicted to receive is based on a model that has a plurality of m features of the respective channel and a plurality of m parameters, such that the plurality of m parameters represents a weight of a corresponding one of the plurality of m features.

In some implementations, the model may be trained (prior to identification of the n channels or after such identification) so that the m parameters used for predicting access requests are determined using a training procedure. The training procedure may include selecting a plurality of training videos and determining, based on the model, an average predicted number of access requests for each of the plurality of training videos. The training videos used for training the model may be posted during the historical time interval, in one implementation. In some implementations, there may be partial or complete overlap between the plurality of training videos and the plurality of past videos posted into the first group of channels referenced in block 510. In some implementations, the plurality of training videos and the plurality of past videos may have no overlap. Having identified the plurality of training videos, the processing device may determine an actual number of access requests received within the first time interval after posting by each of the plurality of training videos, in one implementation. The processing device may determine the m parameters of the model using a fitting procedure, which may include comparing, for each or some of the plurality of training videos, the average predicted number of access requests to the actual number of access requests received by the training videos. In some implementations, the fitting procedure may include performing a least square regression analysis and selecting (adjusting) the m parameters to minimize the sum of squared deviations of the average number of access requests predicted by the model from the actual number of access requests for each or some of the plurality of training videos.

In some implementations, the plurality of m features may include (Model 1) an average logarithm of a number of access requests that a subset of the plurality of past videos posted via a channel (of either a first group of channels or a second group of channels) during the historical time interval received within the first time interval after posting. In other implementations, the plurality of m features may include (Model 2) an average number of access requests that a subset of the plurality of past videos posted via a channel during the historical time interval received within the first time interval after posting. The subset of the plurality of past videos may include all past videos, in some implementations. In other implementations, the subset of the plurality of past videos may include only some of the plurality of past videos, e.g., only videos posted prior to/after a certain time (date), only videos that reference products/services that are similar to the products/services that the future videos are to reference, and so on.

In some implementations, the plurality of m features may further include an average number of access requests that qualified past videos of a channel received within a second time interval ($T_2$, such as three days, a week, a month, etc.) after posting. The second time interval may have a different duration compared to the first time interval, in some implementations, or may have the same duration as the first time interval, in other implementations. The qualified past videos of the channel may be those videos of the channel that were posted within a third time interval ($T_3$). The third time interval may have a different duration compared to the historical time interval (e.g., 3 months, 6 months), in some implementations, or may have the same duration as the first time interval, in other implementations.

At block 530, the processing device may determine, for each channel of the second group of channels, a plurality of adjusted average numbers of access requests that the future video to be posted via the respective channel of the second group is predicted to receive within the first time interval after posting. Each of the plurality of adjusted average numbers of access requests may be determined using an adjustment factor that is based on a number of access requests received by a past video, from the plurality of past videos, posted via a respective channel of the first group. The adjustment factors may be determined based on comparisons of the average numbers of predicted access requests and the actual numbers of access requests received by the past videos, as described in more detail below in relation to FIG. 6.

At block 540, the processing device may determine, based on the plurality of adjusted average numbers of access requests for each channel of the second group of channels, whether the second group of channels satisfies a predetermined access criterion. For example, the target input may specify that the second group of channels has to receive an average number of access requests that exceeds a benchmark number of access requests (e.g., 500 k access requests) with at least a target probability (e.g., 80%). If the processing device determines, at block 540, that the benchmark number of access requests is predicted to be exceeded with a lower than the target probability (e.g., 70%), the processing device may return a negative output (e.g., to the third-party platform 142, which may have requested the access requests prediction), such as the output of "low traffic." If, on the other hand, the processing device determines that the benchmark number of access requests is predicted to be exceeded with a higher than the target probability (e.g., 50%), the processing device may return a positive output, such as the output of "high traffic."

At (optional) block 550, the processing device may determine the channel lineup percentile that represents the fraction of the possible outcomes whose access request counts exceed the benchmark number of access requests (e.g., by analyzing statistics of simulation outcomes, as described above).

Further specifics about how it may be determined that the predetermined access criterion is met (or not) are provided below in relation to FIG. 6.

Figure 6:
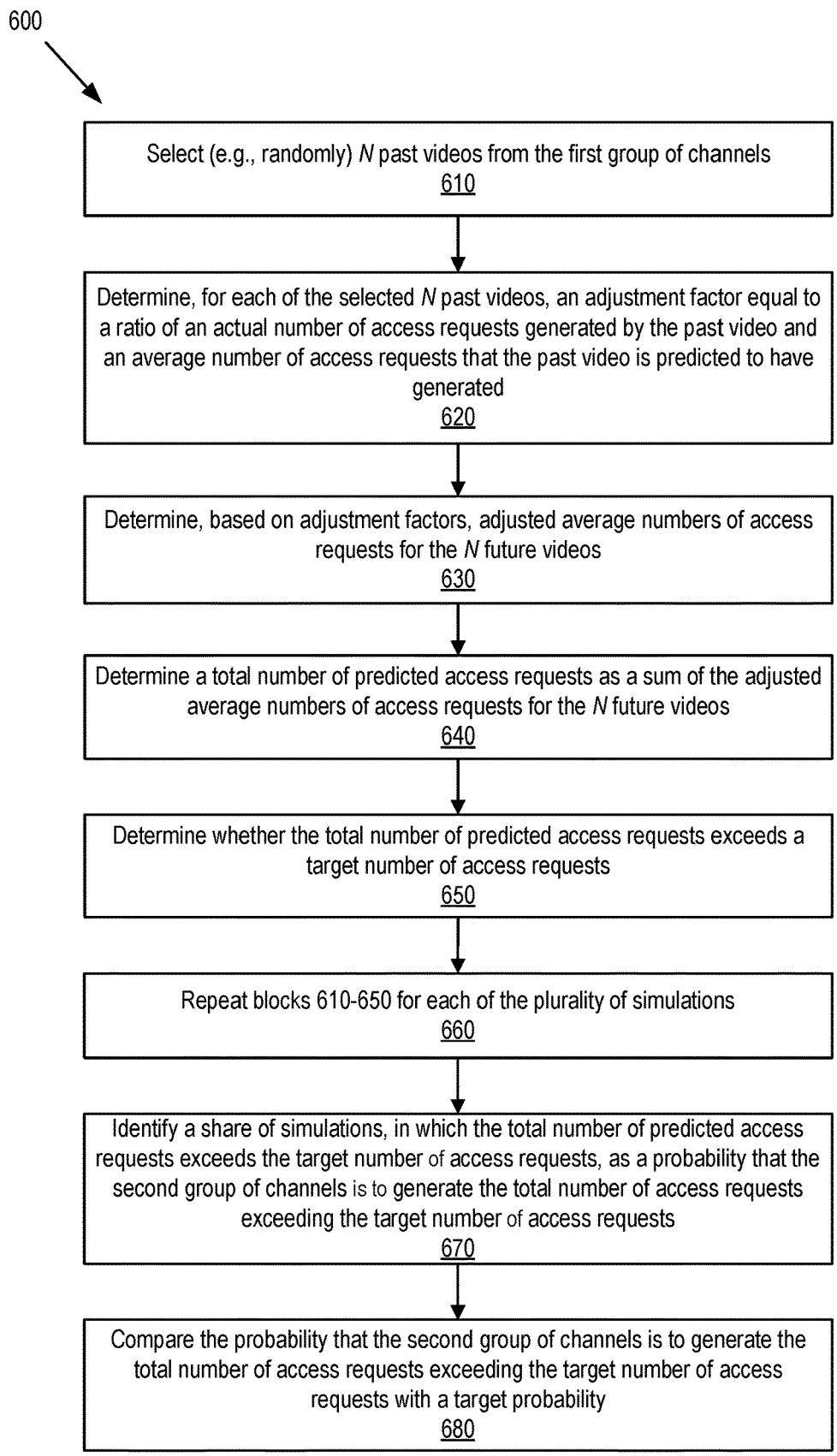
FIG. 6 depicts a flow diagram of aspects of a method for performing multiple simulations to predict a probability that a particular channel lineup is to generate a benchmark number of access requests.

FIG. 6 depicts a flow diagram of aspects of a method 600 for performing multiple simulations to predict a probability that a particular channel lineup is to receive a benchmark number of access requests. The method 600 may be performed by a processing device that may comprise hardware (circuitry, dedicated logic, etc.), software (such as is run on a general purpose computer system or a dedicated machine), or a combination of both. In one implementation, the method 600 is performed by the channel access request estimator 132 of the server machine 130 of FIG. 1. In one implementation, a processing device of the server machine 130 performs method 600.

The method 600 may include a plurality of simulations and may begin with performing a first simulation of the plurality of simulation. Specifically, at block 610, the processing device performing method 600 may select one or more past videos from the first group of channels. The selected past videos may be those videos that were posted during the historical time interval, in one implementation. In some implementation, some or all of the selected past videos may be selected randomly. In some implementations, the number of the selected past videos may be equal to the number N of the future videos that are to be posted via the first group of channels. If the number of future videos to be posted is equal to the number of channels, N=n, one past video may be selected from each selected channel of the first group of channels. If the number of future videos to be posted to the second group of channels is greater than the number of channels of the second group, N>n, with $m_j$ future videos to be posted via the j-th channel, the respective number $m_j$ of past videos posted via the j-th channel of the first group of channels may be selected (e.g., randomly). As a result, for each one of the future N videos, the processing device may have selected one past video posted into the first group of channels that corresponds to (and simulates access requests of) the future video to be posted into the second group of channels.

At block 620, the processing device may determine, for each of the selected N past videos, the adjustment factor. The adjustment factor may be a ratio of (i) an actual number of access requests received by the past video within the first time interval after posting, and (ii) an average number of access requests that the past video is predicted to have received within the first time interval after posting. The predicted average number of access requests for the past video may be determined consisted with the operations of block 520 of the method 500. The actual number of access requests received by the past video may be determined by accessing the channel historical data 230 for the first group of channels.

At block 630, the method 600 may continue with determining, based on the adjustment factors, adjusted average numbers of access requests for the N future videos. To determine each of the plurality of the adjusted average numbers of access requests, the processing device performing method 600 may multiply the average number of access requests that each of the future videos is predicted to receive within a first time interval after posting by the adjustment factor determined for the past video that corresponds to the future video.

At block 640, the method 600 may continue with determining a total number of predicted access requests as a sum S of the adjusted average numbers of access requests for the N future videos. At block 650, the processing device performing method 600 may determine whether the total number of predicted access requests S satisfies the predetermined access criterion. In particular, the processing device may determine whether the total number of predicted access requests S exceeds a benchmark number of access requests G and store the result of comparison. In some implementation, the processing device may perform multiple comparisons with a plurality of benchmark numbers $G_1$, $G_2$, $G_3$ . . . , which may represent a progressively increasing or decreasing sequence, and store the results of such comparisons. In some implementations, the processing device may store the number of predicted access requests S for a subsequent analysis.

The blocks 610-650 illustrate operations that the processing device may perform within one iteration of the process of access requests estimation. At block 660, the processing device performing the method 600 may repeat blocks 610-650 for each of the plurality of simulations. Based on this plurality of simulations, the processing device may determine whether the second group of channels satisfies the predetermined access criterion. Specifically, as described above in relation to blocks 610-650, the processing device may determine, for each of the plurality of simulations, the total number of predicted access requests (for the second group of channels). This may be achieved, as described above in relation to blocks 610-650, by selecting, for each of the n channels, one or more of the adjusted average numbers of access requests (determined based on the first group of channels) from the plurality of adjusted average numbers of access requests, and by determining the total number of predicted access requests by summing the selected adjusted average numbers of access requests for each of the channels of the second group.

At block 670, the processing device may identify a share of simulations, in which the total number of predicted access requests $S^{(i)}$ (with the subscript denoting the i-th iteration) exceeds the benchmark number of access requests, as a probability that the second group of channels is to receive the total number of access requests exceeding the benchmark number of access requests. For example, if the adjusted average number of access requests exceeds the benchmark number of access requests 600 k in 825 out of 900 simulations, whereas in 175 simulation the adjusted average number does not exceed 600 k access requests, the processing device may determine that with the 82.5% probability the second group of channels will exceed the benchmark number of access requests. In some implementation, the processing device may perform multiple comparisons of each of the total number of access requests $S^{(i)}$ with the plurality of benchmark numbers $G_1$, $G_2$, $G_3$ . . . , and determine multiple probabilities of high traffic. For example, the processing device may also determine that with the 74.0% probability the second group of channels will exceed the second benchmark number of access requests 700 k, and that with the 65.5% probability the second group of channels will exceed the third benchmark number of access requests 800 k, and so on.

At block 680, the processing device may compare the probability that the second group of channels is to receive the total number of access requests exceeding the benchmark number of access requests with a target probability. For example the target input 220 may include a condition that the second group of channels receives S=500 k access requests with the 50% probability. If the processing device determines that the probability to receive S=500 k access requests is 49%, the processing device may return an output of "low traffic." If the processing device determines that the probability to receive S=500 k access requests is 53%, the processing device may return an output of "high traffic." For a plurality of benchmark numbers, an output may include a plurality of "high traffic" or "low traffic" predictions for each one of the plurality of benchmark numbers. In some implementations, the output may be communicated to the third-party platform 142. In some implementation, the output may be communicated to the channel lineup selector 212, and the channel lineup selector 212 may generate a different second group of channels. In some implementations, the channel lineup selector 212 may generate a pre-determined number of second groups of channels. In some implementations, the channel lineup selector may continue generating additional second groups of channels until a pre-determined goal is reached, such as a pre-determined number of channel lineups with "low traffic" or "high traffic" outputs.

Figure 7:
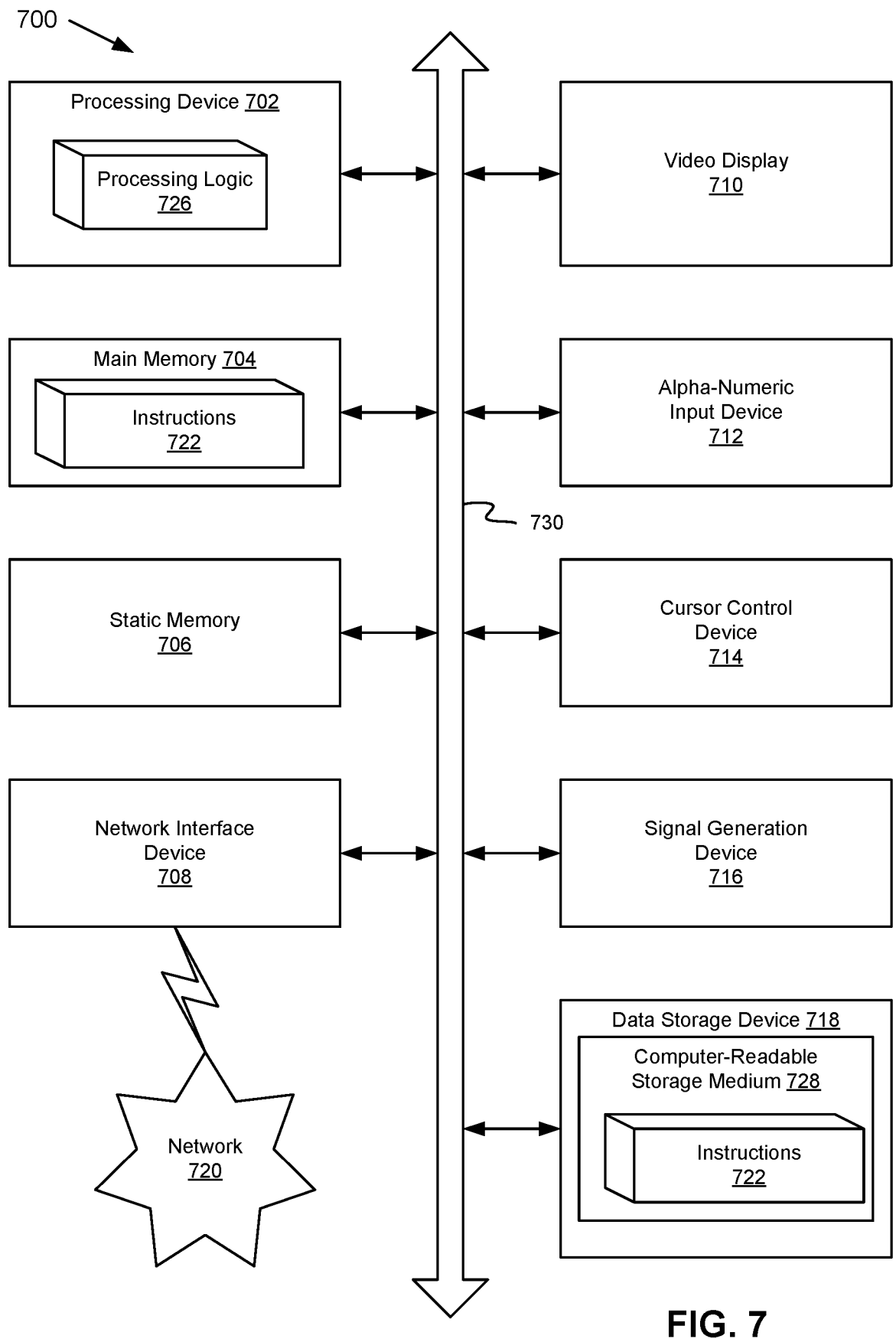
FIG. 7 illustrates an example block diagram of a computing device operating in accordance with one or more implementations of the present disclosure.

FIG. 7 illustrates an example block diagram of a computing device operating in accordance with one or more implementations of the present disclosure. The computer system 700 can be the server machine 130 or client device 110 in FIG. 1. The machine can operate in the capacity of a server or an endpoint machine in endpoint-server network environment, or as a peer machine in a peer-to-peer (or distributed) network environment. The machine can be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processing device (processor) 702, a main memory 704 (e.g., read-only memory (ROM), flash memory, dynamic random access memory (DRAM) such as synchronous DRAM (SDRAM), double data rate (DDR SDRAM), or DRAM (RDRAM), etc.), a static memory 706 (e.g., flash memory, static random access memory (SRAM), etc.), and a data storage device 718, which communicate with each other via a bus 740.

Processor (processing device) 702 represents one or more general-purpose processing devices such as a microprocessor, central processing unit, or the like. More particularly, the processor 702 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 802 can also be one or more special-purpose processing devices such as an application specific integrated circuit (ASIC), a field programmable gate array (FPGA), a digital signal processor (DSP), network processor, or the like. The processor 702 is configured to execute instructions 705 (e.g., for predicting channel lineup access requests) for performing the operations discussed herein.

The computer system 700 can further include a network interface device 708. The computer system 800 also can include a video display unit 710 (e.g., a liquid crystal display (LCD) or a cathode ray tube (CRT)), an input device 712 (e.g., a keyboard, and alphanumeric keyboard, a motion sensing input device, touch screen), a cursor control device 714 (e.g., a mouse), and a signal generation device 720 (e.g., a speaker).

The data storage device 718 can include a non-transitory machine-readable storage medium 724 (also computer-readable storage medium) on which is stored one or more sets of instructions 705 (e.g., for predicting channel lineup access requests) embodying any one or more of the methodologies or functions described herein. The instructions can also reside, completely or at least partially, within the main memory 704 and/or within the processor 702 during execution thereof by the computer system 700, the main memory 704 and the processor 702 also constituting machine-readable storage media. The instructions can further be transmitted or received over a network 730 via the network interface device 708.

In one implementation, the instructions 705 include instructions for predicting channel lineup access requests. While the computer-readable storage medium 724 (machine-readable storage medium) is shown in an exemplary implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

Reference throughout this specification to "one implementation," or "an implementation," means that a particular feature, structure, or characteristic described in connection with the implementation is included in at least one implementation. Thus, the appearances of the phrase "in one implementation," or "in an implementation," in various places throughout this specification can, but are not necessarily, referring to the same implementation, depending on the circumstances. Furthermore, the particular features, structures, or characteristics may be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interact between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Finally, implementations described herein include collection of data describing a user and/or activities of a user. In one implementation, such data is only collected upon the user providing consent to the collection of this data. In some implementations, a user is prompted to explicitly allow data collection. Further, the user may opt-in or opt-out of participating in such data collection activities. In one implementation, the collect data is anonymized prior to performing any analysis to obtain any statistical patterns so that the identity of the user cannot be determined from the collected data.

What is claimed is:

1. A method comprising:
    identifying, by a processing device, a plurality of past videos posted via a first group of channels during a historical time interval, wherein each channel of the first group of channels comprises at least one of the plurality of past videos, and wherein the first group of channels has at least one common characteristic with a second group of channels;
    predicting, using a trained model executed by the processing device, for each channel of the second group of channels, an average number of access requests that a future video to be posted via a respective channel of the second group is to receive within a first time interval after posting;
    performing, by the processing device, a plurality of simulations to determine, for each channel of the second group of channels, a plurality of adjusted average numbers of access requests that the future video to be posted via the respective channel of the second group is predicted to receive within the first time interval after posting, wherein each of the plurality of adjusted average numbers of access requests is determined using an adjustment factor computed based on:
        a number of access requests received by a past video, from the plurality of past videos, posted via a respective channel of the first group, and
        the average number of access requests that the past video is predicted, by the trained model, to have received;
    determining whether the second group of channels satisfies a predetermined access criterion based on the plurality of adjusted average numbers of access requests for each channel of the second group of channels; and
    allocating, by the processing device, one or more computational resources to the second group of channels based on whether the second group of channels satisfies the predetermined access criterion.

2. The method of claim 1, wherein the past video is randomly selected from the plurality of past videos posted via the respective channel of the first group.

3. The method of claim 1, wherein each of the plurality of adjusted average numbers of access requests that the future video to be posted via the respective channel of the second group is predicted to receive within the first time interval after posting is determined by multiplying the average number of access requests that the future video is predicted to receive within the first time interval after posting by the adjustment factor.

4. The method of claim 1, wherein:
    determining, for each channel of the second group of channels, a plurality of adjusted average numbers of access requests that the future video to be posted via the respective channel of the second group is predicted to receive within the first time interval after posting comprises performing a plurality of simulations; and
    determining whether the second group of channels satisfies the predetermined access criterion comprises determining, for each of the plurality of simulations, a total number of predicted access requests for the second group of channels, by:
    selecting, for each of the second group of channels, one or more of the adjusted average numbers of access requests from the plurality of adjusted average numbers of access requests; and
    determining the total number of predicted access requests by summing the selected one or more adjusted average numbers of access requests for each of the second group of channels.

5. The method of claim 4, wherein determining whether the second group of channels satisfies the predetermined access criterion further comprises:
    for each of the plurality of simulations, determining whether the total number of predicted access requests exceeds a benchmark number of access requests.

6. The method of claim 5, wherein determining whether the second group of channels satisfies the predetermined access criterion further comprises:
    identifying a share of the plurality of simulations, in which the total number of predicted access requests exceeds the benchmark number of access requests, as a probability that the second group of channels is to receive, within the first time interval, the total number of access requests exceeding the benchmark number of access requests; and
    comparing the probability that the second group of channels is to receive the total number of access requests exceeding the benchmark number of access requests with a target probability.

7. The method of claim 6, wherein a number of simulations of the plurality of simulations is selected based on a pre-determined confidence level that the probability that the second group of channels is to receive a total number of access requests exceeding the benchmark number of access requests is determined with a set accuracy.

8. The method of claim 1, wherein the adjustment factor is a ratio of (i) an actual number of access requests received by the past video within the first time interval after posting, and (ii) an average number of access requests that the past video is predicted to have received within the first time interval after posting.

9. The method of claim 1, wherein determining the average number of access requests that the future video to be posted via the respective channel of the second group is predicted to receive is based on a model comprising a plurality of in features of the respective channel of the second group and a plurality of in parameters, wherein each of the plurality of in parameters represents a weight of a corresponding one of the plurality of in features.

10. The method of claim 9, wherein the parameters are determined by:
    selecting a plurality of training videos;
    determining, based on the model, an average predicted number of access requests for each of the plurality of training videos;
    determining an actual number of access requests received within the first time interval after posting by each of the plurality of training videos; and
    determining the in parameters using a fitting procedure, wherein the fitting procedure comprises comparing, for each of the plurality of training videos, the average predicted number of access requests to the actual number of access requests.

11. The method of claim 10, wherein determining the fitting procedure comprises performing a least square regression analysis.

12. The method of claim 10, wherein one or more of the training videos were posted during the historical time interval and belong to the plurality of past videos posted via the first group of channels.

13. The method of claim 9, wherein the plurality of in features comprises an average logarithm of a number of access requests that a subset of the plurality of past videos posted via a channel of the first group of channels during the historical time interval received within the first time interval after posting.

14. The method of claim 9, wherein the plurality of iv features comprises an average number of access requests that a subset of the plurality of past videos posted via a channel of the first group of channels during the historical time interval received within the first time interval after posting.

15. The method of claim 9, wherein the plurality of in features comprises an average number of access requests that qualified past videos of a channel received, within a second time interval after posting.

16. The method of claim 15, wherein the qualified past videos of the channel comprise videos of the channel that were posted within a third time interval.

17. The method of claim 1, wherein the first group of channels comprises at least a portion of the second group of channels.

18. The method of claim 1, wherein the at least one common characteristic is a same channel size category for each channel in the first group and each channel in the second group.

19. A system comprising:
a memory; and
a processing device, coupled to the memory, to:
identify a plurality of past videos posted via a first group of channels during a historical time interval, wherein each channel of the first group of channels comprises at least one of the plurality of past videos, and wherein the first group of channels has at least one common characteristic with a second group of channels;
predict, using a trained model, for each channel of the second group of channels, an average number of access requests that a future video to be posted via a respective channel of the second group is to receive within a first time interval after posting;
perform a plurality of simulations to determine, for each channel of the second group of channels, a plurality of adjusted average numbers of access requests that the future video to be posted via the respective channel of the second group is predicted to receive within the first time interval after posting, wherein each of the plurality of adjusted average numbers of access requests is determined using an adjustment factor computed based on:
a number of access requests received by a past video, from the plurality of past videos, posted via a respective channel of the first group, and
the average number of access requests that the past video is predicted, by the trained model, to have received;
determine whether the second group of channels satisfies a predetermined access criterion based on the plurality of adjusted average numbers of access requests for each channel of the second group of channels; and
allocate one or more computational resources to the second group of channels based on whether the second group of channels satisfies the predetermined access criterion.

20. A non-transitory computer-readable medium to store instructions, which when executed by a processing device, cause the processing device to:
identify a plurality of past videos posted via a first group of channels during a historical time interval, wherein each channel of the first group of channels comprises at least one of the plurality of past videos, and wherein the first group of channels has at least one common characteristic with a second group of channels;
predict, using a trained model, for each channel of the second group of channels, an average number of access requests that a future video to be posted via a respective channel of the second group is to receive within a first time interval after posting;
perform a plurality of simulations to determine, for each channel of the second group of channels, a plurality of adjusted average numbers of access requests that the future video to be posted via the respective channel of the second group is predicted to receive within the first time interval after posting, wherein each of the plurality of adjusted average numbers of access requests is determined using an adjustment factor computed based on:
a number of access requests received by a past video, from the plurality of past videos, posted via a respective channel of the first group, and
the average number of access requests that the past video is predicted, by the trained model, to have received:
determine whether the second group of channels satisfies a predetermined access criterion based on the plurality of adjusted average numbers of access requests for each channel of the second group of channels; and
allocate one or more computational resources to the second group of channels based on whether the second group of channels satisfies the predetermined access criterion.

21. The computer-readable medium of claim 20, wherein:
to determine, for each channel of the second group of channels, a plurality of adjusted average numbers of access requests that the future video to be posted via the respective channel of the second group is predicted to receive within the first time interval after posting, the instructions are to cause the processing device to perform a plurality of simulations; and
to determine whether the second group of channels satisfies the predetermined access criterion, the instructions are to cause the processing device to determine, for each of the plurality of simulations, a total number of predicted access requests for the second group of channels, by:
selecting, for each of the second group of channels, one or more of the adjusted average numbers of access requests from the plurality of adjusted average numbers of access requests; and
determining the total number of predicted access requests by summing the selected one or more adjusted average numbers of access requests for each of the second group of channels.

\* \* \* \* \*